June 24, 1930.  M. KONZELMAN  1,767,890
AUTOMOBILE BED
Original Filed July 8, 1927   2 Sheets-Sheet 1

INVENTOR.
Matthew Konzelman,
BY Geo. P. Kimmel.
ATTORNEY.

June 24, 1930.  M. KONZELMAN  1,767,890
AUTOMOBILE BED
Original Filed July 8, 1927   2 Sheets-Sheet 2
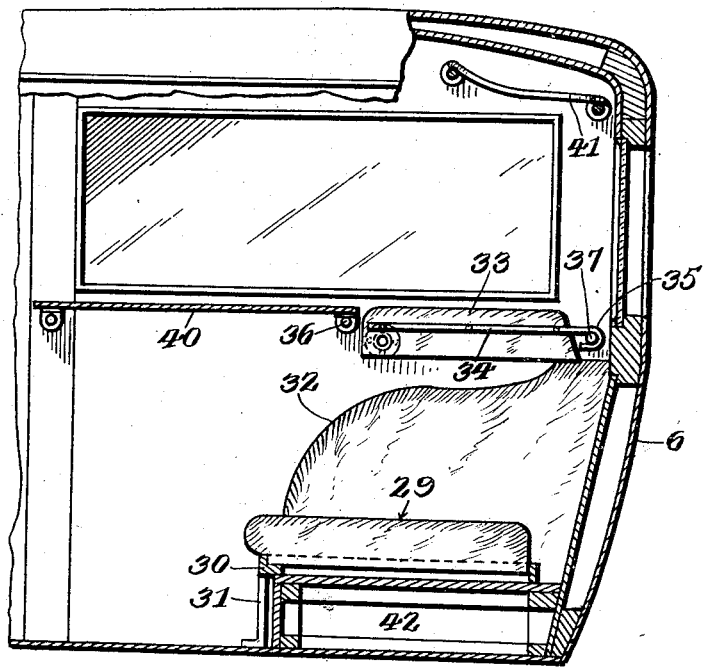
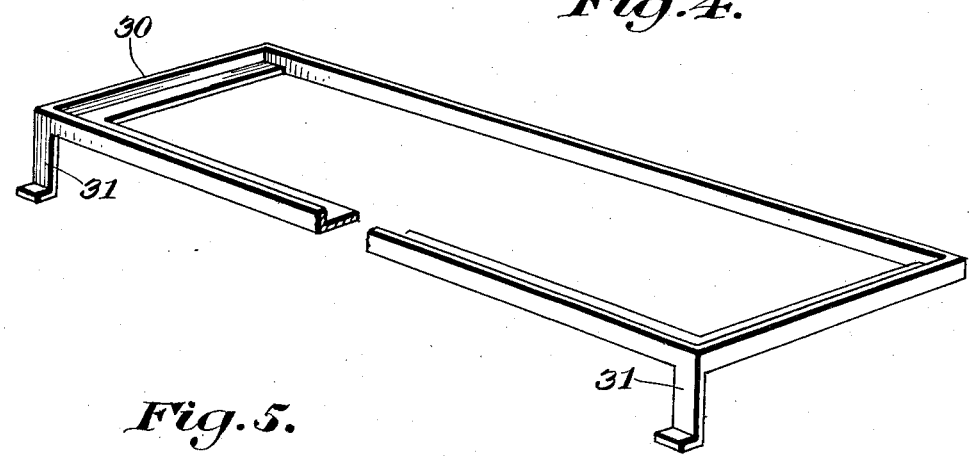
INVENTOR.
Matthew Konzelman,
BY Geo. P. Kimmel
ATTORNEY.

Patented June 24, 1930

1,767,890

UNITED STATES PATENT OFFICE

MATTHEW KONZELMAN, OF PERU, ILLINOIS

AUTOMOBILE BED

Original application filed July 8, 1927, Serial No. 204,285. Divided and this application filed March 26, 1928. Serial No. 264,870.

This invention relates to a convertible structure, more particularly to a combined seat and bed for use in connection with automobiles, and is a division of my application filed July 8, 1927, Serial No. 204,285, and has for its object to provide, in a manner as hereinafter set forth, a convertible structure capable of being employed as the rear seat of an automobile and as a bed when desired.

Further objects of the invention are to provide, in a manner as hereinafter set forth, a convertible structure to constitute a seat and a bed and which is comparatively simple in its construction and arrangement, strong, durable, thoroughly efficient in its use, expeditiously converted from a seat to a bed or from a bed to a seat, readily installed with respect to the automobile body, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 3 is a view similar to Figure 1 illustrating the structure arranged to provide an elevated bed formation.

Figure 4 is a fragmentary view, in perspective of a shiftable support for the seat.

Figure 5 is an end view of the seat back.

Figure 1:
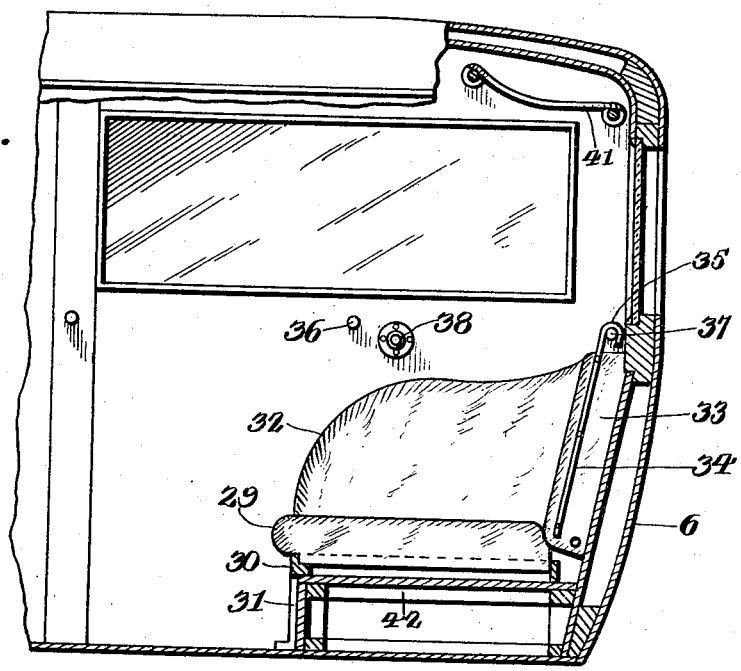
Figure 1 is a fragmentary view partly in section and elevation of an automobile body of the closed car type showing the adaptation therewith of a convertible structure in accordance with this invention and providing the rear seat of the automobile.

Referring to the drawings the rear seat is indicated at 29, and is carried by a shiftable supporting frame 30 having its forward side provided with supporting legs 31. The seat 29 is mounted in, extended from, supported by and overlaps the top edges of the frame 30. The front and sides of the frame are of angle shaped cross section to provide a vertical and a horizontal part and with the latter extending inwardly from the lower end of the former. See Figure 4. The frame 30 slides between the sides 32 for the rear seat, or can be positioned to slide between the sides of the automobile body 6. The back of the rear seat is indicated at 33 and which is removably mounted in position. The back 33 centrally at each side thereof is formed with a bar 34 which projects therefrom and is formed at its upper end with a hook shaped terminal 35.

Figure 2:
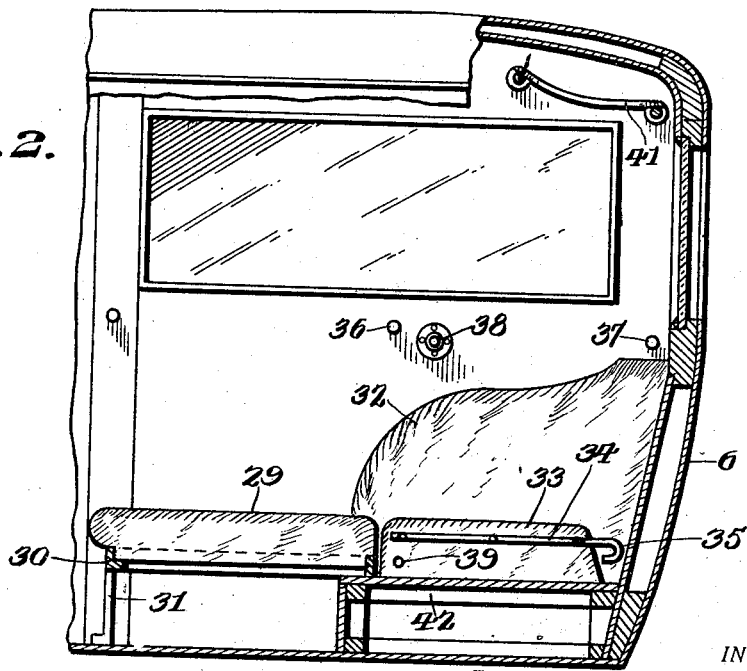
Figure 2 is a view similar to Figure 1 illustrating the convertible structure as adjusted to bed formation.

The seat 29 and frame 30 can be shifted to the position shown in Figure 2, and the back 33 disconnected from the position shown in Figure 1 and arranged in the position as shown in Figure 2, under such conditions the seat 29 and back 33 will provide a bed.

Each side of the body portion 6 of the automobile is formed with a pair of spaced lugs 36, a lug 37 and a fastener device 38. The lug 37 and fastener device 38 are arranged below lugs 36. Each side of the back 33 is formed with a socket 39. The back 33 can be supported in a horizontal position, see Figure 3, by the engaging of the fastening device 38 in the socket 39, and with the hook shaped terminal 35 engaging over the lug 37. The lugs 36 will provide for connection of the body 6 to the automobile, a canvas 40, and which will form a continuation of the back 33 and provide a bed. The body 6 of the car can be provided with a rack 41.

The seat 29 and back 33 are in the form of cushions. The back 33 can be mounted in the position as shown in Figure 3 and provide a rack, and as before stated can also form a continuation of the canvas 40. The frame 30 is mounted on a stationary support 42 and the latter supports the back 33 when the frame 30 has been extended to position the seat 29 to coact with the back 33 to provide a bed.

It is thought the many advantages of a convertible structure, in accordance with this invention, which can be employed as a rear seat of an automobile and also as a bed, can be readily understood, and although the preferred embodiment of the invention is as illustrated and described, yet it is to be understood that changes in the details of construction can be had which fall within the scope of the invention as claimed.

What I claim is:

1. A convertible structure for use for automobiles comprising spaced lugs adapted to be secured to the inner face of each side of the automobile body, fastener devices adapted to be secured to the inner face of each side of the automobile body, a removable back element for the rear seat of the automobile, said fastener devices arranged rearwardly of certain of said lugs, a flexible support for connection to the lugs positioned forwardly of the fastener devices, means at the ends of and extended above said back element for normally connecting the latter to the other of said lugs, and said back element provided with means for receiving said fastener devices for maintaining said back element in connection with the lugs to which the back element is attached in a horizontal position to form a continuation of said flexible support.

2. A convertible structure for use for automobiles comprising spaced lugs adapted to be secured to the inner face of each side of the automobile body, fastener devices adapted to be secured to the inner face of each side of the automobile body, a removable back element for the rear seat of the automobile, said fastener devices arranged rearwardly of certain of said lugs, a flexible support for connection to the lugs positioned forwardly of the fastener devices, means at the ends of and extended above said back element for normally connecting the latter to the other of said lugs, and said back element provided with means for receiving said fastener devices for maintaining said back element in connection with the lugs to which the back element is attached in a horizontal position to form a continuation of said flexible support, the lugs to which said back element is connected being arranged in alignment with said fastener devices and said fastener devices positioned below the lugs to which the flexible support is attached.

In testimony whereof, I affix my signature hereto.

MATTHEW KONZELMAN.